(12) United States Patent
Williams et al.

(10) Patent No.: US 12,298,491 B2
(45) Date of Patent: May 13, 2025

(54) HAPTIC FEEDBACK SYSTEM FOR VIRTUAL REALITY BORESCOPE INSPECTION

(71) Applicant: Rolls-Royce plc, London (GB)

(72) Inventors: Rory Williams, London (GB); Joanna Tomlin, London (GB); Matthew Calder, London (GB); Aditya Banerjee, London (GB); Daniel Matthew Gillians, London (GB); Benedick James Loudon von Bertele, London (GB)

(73) Assignee: Rolls-Royce plc, London (GB)

( * ) Notice: Subject to any disclaimer, the term of this patent is extended or adjusted under 35 U.S.C. 154(b) by 813 days.

(21) Appl. No.: 17/645,413

(22) Filed: Dec. 21, 2021

(65) Prior Publication Data

US 2022/0197009 A1 Jun. 23, 2022

Related U.S. Application Data

(60) Provisional application No. 63/129,125, filed on Dec. 22, 2020.

(51) Int. Cl.
*G02B 23/24* (2006.01)
*G06F 3/01* (2006.01)
(Continued)

(52) U.S. Cl.
CPC ......... *G02B 23/2484* (2013.01); *G06F 3/016* (2013.01); *G06T 19/006* (2013.01);
(Continued)

(58) Field of Classification Search
CPC .......... G02B 23/2484; G02B 2027/018; G06F 3/016; G06F 3/011; G06F 3/014;
(Continued)

(56) References Cited

U.S. PATENT DOCUMENTS 5,191,879 A * 3/1993 Krauter ............. A61B 1/00188
92/92
2007/0070340 A1* 3/2007 Karpen ................ G01N 21/954
356/241.1

(Continued)

OTHER PUBLICATIONS

"Vive Controller Mixed Reality 1/4" camera mount", Sep. 20, 2017, Retrieved from https://www.thingiverse.com/thing:2545640, 5 pgs.

(Continued)

*Primary Examiner* — Kurt Fernstrom
*Assistant Examiner* — Selwa A Alsomairy
(74) *Attorney, Agent, or Firm* — Shumaker & Sieffert, P.A.

(57) ABSTRACT

A borescope feedback system with haptic feedback includes a borescope cable, a containment device, a cable sensor that is configured to detect motion of the borescope cable and output cable sensor data indicative of the motion of the borescope cable, a feedback device that is configured to controllably apply friction to the borescope cable, and a computing device configured to output a graphical user interface of a virtual reality representation of the borescope cable in a virtual environment; determine at least one of a direction of axial motion, a direction of circumferential motion, or a magnitude of the motion of the borescope cable; determine a collision of the virtual reality representation of the distal portion of the borescope cable with an obstruction in the virtual environment; and output a feedback signal to the feedback device that causes the feedback device to apply an amount of friction to the borescope cable.

20 Claims, 8 Drawing Sheets

(51) Int. Cl.
*G06T 19/00* (2011.01)
*G09B 5/02* (2006.01)
*G09B 9/00* (2006.01)
*G09B 19/24* (2006.01)

(52) U.S. Cl.
CPC .............. *G09B 5/02* (2013.01); *G09B 9/00* (2013.01); *G09B 19/24* (2013.01)

(58) Field of Classification Search
CPC .......... G06T 19/006; G09B 5/02; G09B 9/00; G09B 19/24; G01N 21/954
See application file for complete search history.

(56) References Cited

U.S. PATENT DOCUMENTS

| | | | | |
|---|---|---|---|---|
| 2014/0333753 A1* | 11/2014 | Chapman | ................ | E03F 7/12 74/500.5 |
| 2019/0064080 A1* | 2/2019 | Glover | ............... | G02B 23/2484 |

OTHER PUBLICATIONS

Vembar et al., "Visuohaptic Borescope Inspection Simulation Training: Modeling Multi-Point Collision Detection/Response and Evaluating Skills Transfer", May 31-Jun. 2, 2010 Graphics Interface Conference, 8 pgs.

Vembar et al., "A Haptic Virtual Borescope for Visual Engine Inspection Training", Apr. 2008, 8 pgs.

Force Sensing Glove | Grip Pressure Measurement—PPS, Retrieved on Dec. 20, 2021 from https://en-gb.pressureprofile.com/body-pressure-mapping/tactile-glove, 6 pgs.

Haptics | Ultrleap, Retrieved on Dec. 20, 2021 from https://www.ultrahaptics.com/products-programs/touch-development-kit/, 8 pgs.

HTC Vive Joystick mod., Dec. 12, 2017, Retrieved from https://www.thingiverse.com/thing:2705398, 5 pgs.

VRgluv | Force Feedback Haptic Gloves for VR Training, Retrieved on Dec. 20, 2021 from https://www.vrgluv.com/, 6 pgs.

\* cited by examiner

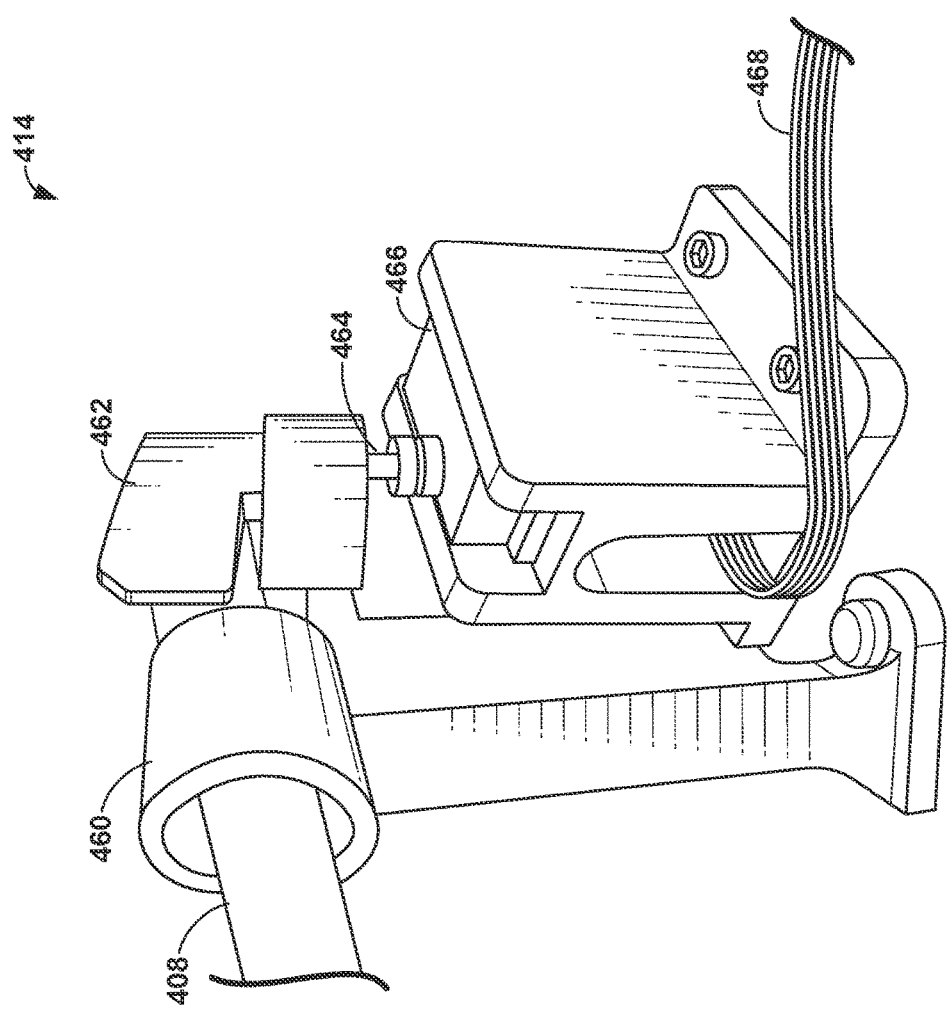

HAPTIC FEEDBACK SYSTEM FOR VIRTUAL REALITY BORESCOPE INSPECTION

This application claims the benefit of U.S. Provisional Patent Application No. 63/129,125, filed Dec. 22, 2020, which is incorporated herein by reference in its entirety.

TECHNICAL FIELD

The disclosure relates to methods and systems for virtual reality (VR) borescope inspection with haptic feedback.

BACKGROUND

Borescopes may be used for inspecting internal components of mechanical equipment, such as gas turbine engines. Typical borescopes include a borescope cable having a distal optical system that is coupled to a viewing means and a cable controller to control an angle and direction of deflection of a distal portion of the cable. During use, an operator may guide the cable into cavities within the equipment to inspect internal components. Operator technique and skill may be important to navigate through internal cavities of the equipment and avoid damaging the equipment, the borescope, or both. Training may enable operators to learn techniques and improve skills for completing borescope inspections.

SUMMARY

In some examples, the disclosure describes a system that may include a borescope cable having a flexible elongate member extending along a longitudinal axis; a containment device having an exterior surface defining an aperture configured to receive at least a distal portion of the borescope cable therethrough and an interior surface defining a cavity; a cable sensor coupled to the interior surface of the containment device, where the cable sensor is configured to detect motion of the borescope cable and output cable sensor data indicative of the motion of the borescope cable; a feedback device coupled to the interior surface of the containment device, where the feedback device is configured to controllably apply friction to the borescope cable; and a computing device. The computing device may include one or more storage devices and one or more processors coupled to the storage devices. The storage devices may include instructions that cause the one or more processors to: output, for display by a display device, a graphical user interface of a virtual reality representation of a distal portion of the borescope cable in a virtual environment; determine, based on the cable sensor data output by the cable sensor, at least one of a direction of axial motion, a direction of circumferential motion, or a magnitude of the motion of the borescope cable; determine, based on the at least one of the direction of the axial motion, the direction of the circumferential motion, or the magnitude of the motion, a collision of the virtual reality representation of the distal portion of the borescope cable with an obstruction in the virtual environment; and output, in response to determining the collision, a feedback signal to the feedback device, wherein the feedback signal is configured to cause the feedback device to apply an amount of friction to the borescope cable.

In other examples, the disclosure describes a method for generating haptic feedback for a borescope cable that may include a flexible elongate member extending along a longitudinal axis using a containment device having an exterior surface defining an aperture configured to receive at least a distal portion of the borescope cable therethrough and an interior surface defining a cavity. The method may include determining, by a computing device, based on cable sensor data output by a cable sensor, at least one of a direction of axial motion, a direction of circumferential motion, or a magnitude of the motion of the borescope cable, where the cable sensor is coupled to the interior surface of the containment device and configured to detect motion of the borescope cable and output cable sensor data indicative of the motion of the borescope cable. The method also may include determining, by the computing device, based on the at least one of the direction of the axial motion, the direction of the circumferential motion, or the magnitude of the motion, a collision of a virtual reality representation of a distal portion of the borescope cable with an obstruction in a virtual environment. The method also may include outputting, by the computing device, in response to determining the collision, a feedback signal to a feedback device coupled to the interior surface of the containment device. The method also may include applying, by the feedback device, based on the feedback signal, an amount friction to the borescope cable.

In other examples, the disclosure describes a kit that includes a borescope cable having a flexible elongate member extending along a longitudinal axis; a borescope controller coupled to a proximal end of the borescope cable and configured to generate a controller output indicative of a deflection of the borescope cable; a containment device having an exterior surface defining an aperture configured to receive at least a distal portion of the borescope cable therethrough and an interior surface defining a cavity, where the containment device includes a coiled tube defining a lumen coupled to the aperture, and where the lumen is configured to receive at least a distal portion of the borescope cable therethrough; a cable sensor coupled to the interior surface of the containment device, where the cable sensor is configured to detect motion of the borescope cable and output cable sensor data indicative of the motion of the borescope cable; and a feedback device coupled to the interior surface of the containment device, where the feedback device comprises at least one cam cleat coupled to a servomotor configured to controllably apply friction from the cam cleat to the borescope cable.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A and 4B are a conceptual diagrams illustrating an example feedback device of a VR borescope inspection system.

DETAILED DESCRIPTION

Figure 1:
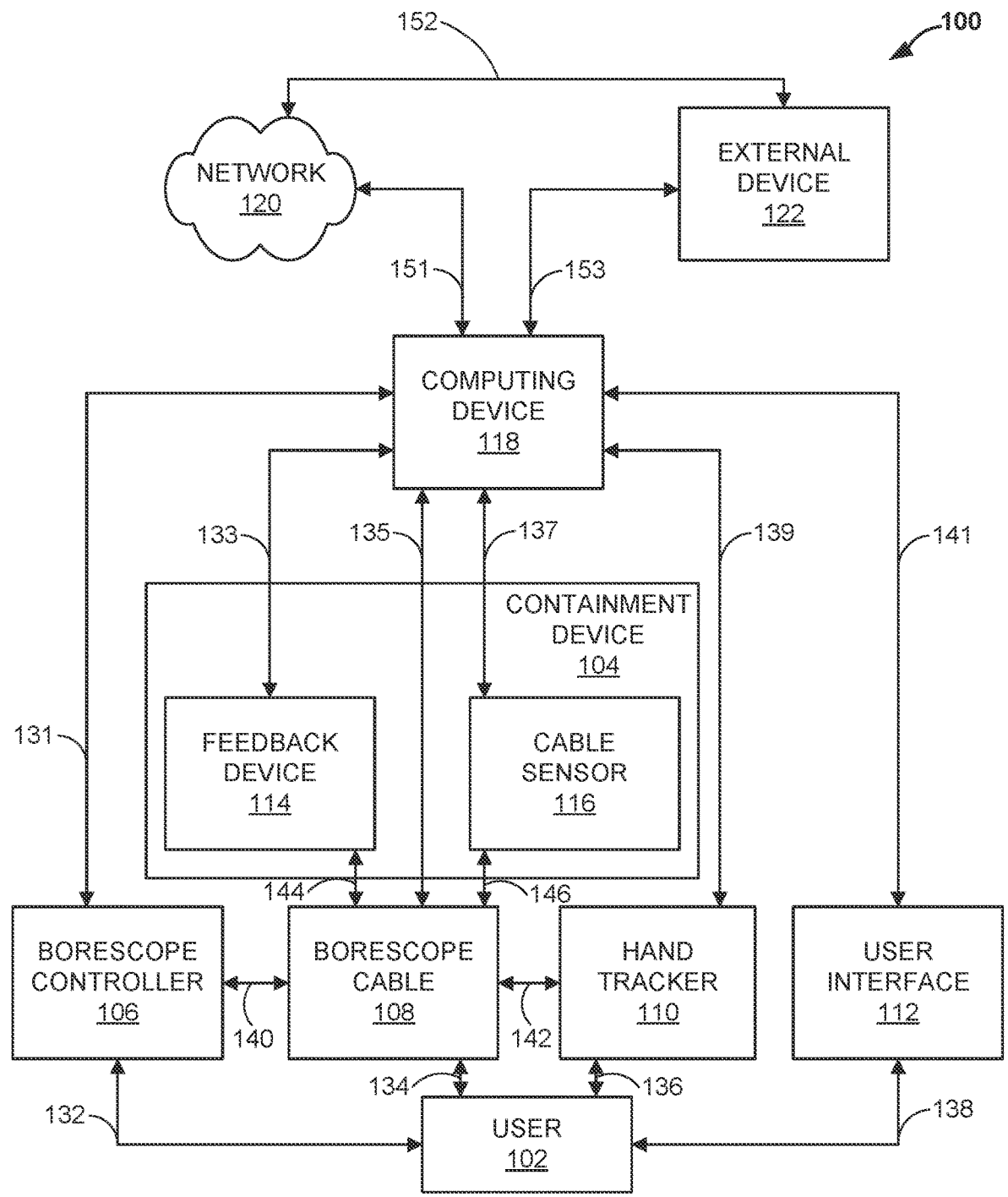
FIG. 1 is a conceptual and schematic block diagram illustrating an example system for virtual reality (VR) borescope inspection.

The disclosure describes systems and techniques for virtual reality (VR) borescope inspection with haptic feedback. An example system may include a containment device having a feedback device, a cable sensor, a borescope cable, a borescope controller, and an optional hand-tracker device. The containment device is configured to receive the borescope cable and house the feedback device and cable sensor. The feedback device is configured to selectively apply friction to the borescope cable as the borescope cable is fed into and/or retracted from the containment device, for example, to simulate interaction between the borescope cable and a virtual environment. Although described herein as using friction, other forces, such as electromagnetic forces, could be applied to the borescope cable. The borescope controller is configured to control movement of the distal end of a virtual borescope cable in the VR environment. The borescope controller may be configured to simulate the thumb control, the dimensions, the weight, and the center of mass of a selected actual borescope controller. The optional hand-tracker device is configured to track the posture and/or movement of an operator's hand as the borescope cable is fed into, or retracted from, the containment device.

The described system and techniques enable VR training with more realistic physical control and physical feedback of borescope operation to improve borescope inspection training compared other borescope training systems. For example, other borescope training systems may require mock-up mechanical systems, such as gas turbine engines, to provide a real environment through which to navigate a borescope during training. While mock-ups may provide real or substantially real physical control and/or physical feedback, mock-ups may be expensive, large, and/or difficult to move. By using a virtual environment, operators may be trained without mock-ups, reducing cost of training, improve efficiency of training (e.g., the virtual environment may be reconfigured to represent different scenarios more quickly than mock-ups), enabling training in locations that otherwise would not be suitable for a mock-up, and/or enable training systems to be moved between locations.

Some virtual environments, however, may inadequately simulate the physical control and/or the physical feedback of actual borescope systems or mock-up training systems. By using a containment device having one or more feedback devices in conjunction with a virtual environment, the described systems and techniques provide a more realistic experience, including physical control and physical feedback of a borescope cable, compared to systems without feedback devices. For example, the feedback devices may apply friction to the borescope cable to simulate resistance to push forces and/or pull forces on the borescope cable.

Additionally, the borescope controller may include a standardized controller that is modified to simulate the thumb control (or other controls), dimensions, weight, and/or center of mass of a selected actual borescope controller. Hence, the tactile sensation experienced by an operator during training may more accurately simulate operation of an actual borescope controller and/or the borescope controller may be readily modified to simulate different borescope controllers.

Furthermore, the optional hand-tracker may improve operator technique in handing the borescope cable, including hand posture, which may include grip pressure, hand position, and/or use of particular fingers, by alerting the operator of improper hand posture during training sessions.

In at least these ways, the described systems and technique may enable VR training with more realistic physical control and physical feedback of borescope operation to improve borescope inspection training compared other borescope training systems.

FIG. 1 is a conceptual and schematic block diagram illustrating an example VR borescope inspection system 100 (hereinafter, system 100). System 100 is configured to provide haptic feedback to a user 102 during a VR borescope training session. In some examples, system 100 includes a containment device 104, a borescope controller 106, a borescope cable 108, a hand-tracker 110, a user interface 112, a feedback device 114, a cable sensor 116, and a computing device 118. System 100 may include, or be communicatively coupled to, a network 120 and/or one or more external devices 122.

User 102 may include an operator (e.g., a trainee, a trainer, or another person) that interacts with one or more components of system 100. In some examples, user 102 may physically interact with or otherwise provide an input (e.g., physical movement, key-strokes, or voice commands) to one or more of borescope controller 106 via a connection 132, borescope cable 108 via a connection 134, hand-tracker 110 via a connection 136, and user interface 112 via a connection 138. In this way, connections 132, 134, 136, and 138 may represent physical interaction with the respective components. Additionally, or alternatively, one or more of borescope controller 106, borescope cable 108, hand-tracker 110, and user interface 112 (e.g., via the respective connections) may provide one or more of audible, tactile, or visual feedback to user 102. In these ways, as further discussed below, user 102 may interact with system 100.

Containment device 104 is configured to simulate a mechanical system suitable for borescope inspection. Containment device 104 may include a case or similar container comprising any suitable material, such as one or more metals and/or plastics, defining a cavity therein. In some examples, containment device 104 may have a size suitable for carrying by user 102. For example, dimensions of containment device 104 may include a length less than about 56 centimeters (cm) (e.g., less than about 22 inches), a width less than about 45 cm (e.g., less than about 18 inches), and a depth less than about 25 cm (e.g., less than about 10 inches).

The cavity of containment device 104 may be shaped to house one or more components of system 100. For example, containment device 104 may house at least cable sensor 116 and feedback device 114. In some examples, containment device 104 may be configured to additionally house at least one of borescope controller 106, borescope cable 108, hand-tracker 110, user interface 112, feedback device 114, cable sensor 116, and computing device 118 for transport or storage.

During operation, containment device 104 may receive at least a distal portion of borescope cable 108 therein. For example, an exterior surface of containment device 104 may define an aperture sized to receive a cross-section of borescope cable 108 therethrough. In some examples, containment device 104 may include a coiled tube coupled to the aperture (e.g. the exterior surface defining the aperture) and having a cross-sectional dimension sized to receive a cross-section of borescope cable 108 therein. In this way, when borescope cable 108 is inserted through the aperture, borescope cable 108 may travel through a lumen of the coiled tube. In some examples, the coiled tube may be sized to allow the length of borescope cable 108 to be fully insertable into the coiled tube.

Borescope controller 106 (e.g., controller 106) may be operatively coupled (e.g., connected) to computing device 118 via link 131 and configured to simulate control of a distal portion of borescope cable 108 in a virtual environment. For example, controller 106 may be configured to generate a controller output indicative of a deflection of borescope cable 108, which may be represented by computing device 118 in a virtual environment.

In some examples, controller 106 may include VR controller including at least one input device, such as a joystick or a touchpad. In some examples, controller 106 may include a VIVE™ controller, available from HTC Corporation, Taoyuan City, Taiwan. In other examples, controller 106 may include a selected actual borescope controller (e.g., an Olympus IPLEX RX available from Olympus Corporation, Tokyo, Japan) configured to communicatively couple with computing device 118 to simulate control of a distal portion of borescope cable 108 in a virtual environment. For example, rather than a controller output actually controlling motion of a distal portion of borescope cable 108, the controller output may control borescope cable movement in the virtual environment.

Controller 106 may generate a controller signal (e.g., controller output) representative of the controller input via connection 132 from user 102, e.g., physical movements of a joystick of borescope controller 106 by user 102 or the like, and may provide the controller signal to computing device 118 via link 131. Additionally, or alternatively, computing device 118 may generate a controller feedback signal representative of an interaction of borescope cable 108 with the virtual environment, and may provide the controller feedback signal to controller 106 via link 131. The controller feedback signal may be configured to provide audible, tactile, or visual feedback to user 102 via connection 132. For example, the controller feedback signal may cause controller 106 to vibrate, cause a joystick of controller 106 to move, cause a speaker of controller 106 to sound an alert, or cause an indicator light or display of controller 106 to display an alert.

Link 131 may be any suitable wired connection (e.g., metal conductors, fiber optics, Ethernet, or the like), wireless connection (e.g., personal area network, local area network, metropolitan area network, wide area network, or the like), or a combination of both. For example, controller 106 may include a communications interface that includes a network interface card, such as an Ethernet card, an optical transceiver, a radio frequency transceiver, a Bluetooth® interface card, WiFi' radios, USB, or any other type of device that can send and/or receive information.

In some examples, borescope controller 106 and/or computing device 118 may be configured to condition a respective signal prior to providing the signal to the other of borescope controller 106 or computing device 118. Signal conditioning may include, but is not limited to, amplification, filtering, attenuation, isolation, and/or transformation. In some examples, borescope controller 106 and/or computing device 118 may provide an unconditioned signal to the other of borescope controller 106 or computing device 118, which may condition the signal.

In some examples, controller 106 may include one or more mounts that are configured to simulate the thumb control, dimensions, weight, and/or center of mass of a selected actual borescope controller. For example, the one or more mounts may include features and/or weights that attach to a VR controller at selected locations and selected angles to simulate the same or substantially similar mass and center of mass of a selected actual borescope controller. Additionally, or alternatively, the one or more mounts may include a joystick configured to interface with a control surface (e.g., touch pad) of the VR controller. A shape of the joystick may be the same or substantially similar to a joystick of an actual selected borescope. The one or more mounts may be three-dimensional (3D) printed, cast, or formed using any manufacturing technique to provide plastic and/or metal components for fixing to a VR controller. The one or more mounts may be attached to the VR controller using any suitable mechanism, such as, for example, one or more adhesives, thermal welding, friction fitting, or the like.

Borescope cable 108 includes, or is configured to simulate, an optical instrument configured for visual inspection of narrow and/or difficult to reach cavities, such as internal cavities of mechanical systems, including engines, such as gas turbine engines. User 102 may handle borescope cable 108 as represented by connection 134. Borescope cable 108 may include an elongate member (e.g., tubular member) extending along a longitudinal axis. In some examples, borescope cable may have a rigid portion, a flexible portion, or both.

A proximal end of borescope cable 108 may be coupled to controller 106, e.g., as illustrated by coupling 140. Coupling 140 may include a mechanical coupling and optional optical and/or electrical coupling.

The tubular member of borescope cable 108 may include two or more lumens or concentric tubes. In some example, the tubular member may include a radially outer sheath. The outer sheath may be configured to protect the tubular member from abrasion. In some examples, the outer sheath may include surface features along the longitudinal axis indicative of a length of borescope cable 108 relative to a distal end. For example, the outer sheath may include a braided metal sleeving defining a regularly repeating pattern of tows along the longitudinal axis. In this way, the tubular member may be configured for optical measurement of a length relative to a distal end.

In some examples, the tubular member may include a radially inner plurality of fiber optic cables that are configured to transmit light from a proximal light source, such as one or more light emitting diodes (LEDs), to a distal end of the tubular member to illuminate an object. The tubular member also may include a central member having one or more cables configured to transmit an image from a distal camera to a user interface 112 or a distal objective lens to a proximal eyepiece.

By including at least the outer sheath, and optionally, the fiber optical cables and/or central member, borescope cable 108 may more accurately simulate a flexibility, weight, and feel of an actual borescope cable compared to other cable members that do not include these features.

In some examples, borescope cable 108 may be operatively coupled to computing device 118 via link 135. Link 135 may be the same or substantially similar to link 131 described above. For example, borescope cable 108 may be configured for both VR training and real-world borescope inspection. In this way, system 100 may increase training effectiveness by enabling user 102 to use the same borescope cable 108, e.g., having a particular flexibility, weight, and feel, in both a VR environment and a real-world environment.

Hand-tracker 110 may include a wearable device that is operatively coupled to computing device via link 139, and configured to track hand posture and/or movements of a hand of user 102 as the borescope cable is fed into, or retracted from, containment device 104. Hand-tracker may be worn by user 102 or otherwise physically coupled to the hand of user 102, as illustrated by connection 136. Hand movements may include, for example, movement in 3D space, hand positions, hand gestures, and/or interactions with components of system 100, such as borescope cable 108.

Hand-tracker 110 may include one or more sensors, e.g., optical or infrared sensors, configured to track a position of one or more portions of hand-tracker 110 in 3D space. Additionally, or alternatively, hand-tracker 110 may interact with borescope cable 108. For example, hand-tracker 110 may include two or more conductive elements configured to form an electrical circuit when user 102 grasps borescope cable 108 and may optionally track pressure applied by the hand of user 102 to borescope cable 108. By tracking hand position and/or gestures, and optionally tracking interaction with borescope cable 108, hand-tracker 110 may enable system 100 to provide feedback related to techniques for handling borescope cable 108, such as how much force to apply and how to hold particular tools when performing borescope inspection or maintenance tasks.

Hand-tracker 110 may generate a posture signal representative of hand posture and may output the posture signal to computing device 118 via link 139. Link 139 may be the same as or substantially similar to link 131 described above. Additionally, hand-tracker 110 may be configured to condition the posture signal. In this way, system 100 may be configured to monitor a technique of user 102 as user 102 handles borescope cable 108.

In some examples, computing device 118 may generate a posture feedback signal representative of an interaction of borescope cable 108 with the virtual environment and may provide the posture feedback signal to hand-tracker 110 via link 139. For example, the posture feedback signal may cause hand-tracker 110 to provide to user 102 haptic feedback. In this regard, hand-tracker 110 may include one or more vibration device (e.g., an electrical motor coupled off-axis to a cylinder or cog), such that the haptic feedback of hand-tracker 110 may include vibration of one or more portions of hand-tracker 110. In some examples, hand-tracker 110 may include one or more resistance device (e.g., magnets or electromechanical actuators configured to controllable resist movement in one or more directions), such that the haptic feedback of hand-tracker 110 may provide force resistance to one or more portions of hand-tracker 110. Force resistance may include resistance or constraint of one or more digits of a hand of user 102. In this way, system 100 may be configured to provide feedback related to techniques for handling borescope cable 108, such as how to hold borescope cable 108 when performing borescope inspection.

Feedback device 114 may be operatively coupled to computing device 118 via link 133 and configured to, in response to a signal from computing device 118, selectively apply friction to borescope cable 108 as borescope cable 108 is fed into and/or retracted from containment device 104. Feedback device 114 may be rigidly coupled to an interior surface of containment device 104 and/or the coiled tube of containment device 104. Feedback device 114 may include any suitable mechanism to mechanically constrain, or otherwise physically interact with, borescope cable 108, as illustrated by connection 144. For example, feedback device 114 may include a cam cleat coupled to a servomotor that rotates the cam cleat by a selected amount to simulate contact with an obstruction in the virtual environment. As borescope cable 108 is fed into and/or retracted from containment device 104, feedback device 114 may apply friction to borescope cable 108 to simulate an interaction with the virtual environment.

In examples in which feedback device 114 includes a cam cleat, a force in one direction may be restricted, and a force in an opposing direction may be less restricted or unrestricted. For example, when the servomotor rotates the cam cleat to contact borescope cable 108, a push force may cause further rotation of the cam cleat, and thereby increase an amount of friction between the cam cleat and borescope cable 108. In some examples, feedback device 114 may include a first cam cleat and a second, opposing cam cleat, or a plurality of first cam cleats and a plurality of second, opposing cam cleats. In this way, feedback device 114 may be configured to selectively restrict movement of borescope cable 108 in both distal and proximal directions, e.g., advancing or retracting.

Although described herein as including cam cleats, in other examples, feedback device 114 may include one or more actuatable bars, rollers, pads, magnets, or other features that physically interact with borescope cable 108 to simulate an interaction between borescope cable 108 and the virtual environment.

Cable sensor 116 may be operatively coupled to computing device 118 via link 137 and configured to detect a relative movement of borescope cable 108 as borescope cable 108 is fed into and/or retracted from containment device 104. Cable sensor 116 may be rigidly coupled to an interior surface of containment device 104 and/or the coiled tube of containment device 104. As borescope cable 108 is fed into and/or retracted from containment device 104, cable sensor 116 may interaction, e.g., as illustrated by connection 146, with borescope cable 108 to detect a length of borescope cable 108 that has been inserted into containment device 104. Cable sensor 116 may generate a signal representative of a length of borescope cable 108 interested into containment device 104, and may provide the signal to computing device 118 via link 137.

Cable sensor 116 may include any suitable mechanism for measuring a length of borescope cable 108 inserted into containment device 104. In some examples, cable sensor 116 may include an optical sensor, such as a laser sensor, that detects a plurality of features regularly repeating in an axial direction along the length of an outer surface of borescope cable 108. In this way, the plurality of feature may be indicative of a length of borescope cable 108 that is inserted into containment device 104. For example, an outer sheath of borescope cable 108 may include a braided metal sleeve, and the braided (e.g., tows) may define the plurality of features detectable by the optical sensor. In other examples, the plurality of features may include other markings, such as colored markings, protrusions, recesses, or the like.

Computing device 118 is configured to receive data from at least borescope controller 106 and cable sensor 116 to simulate borescope cable 108 moving within a virtual environment. In some examples, computing device 118 may be operatively coupled with one or more components of system 100 to send data to and/or receive data from any of borescope controller 106, borescope cable 108, hand-tracker 110, user interface 112, feedback device 114, and/or cable sensor 116. In some examples, computing device 118 may be disposed on or within containment device 104. In other examples, computing device 118 may include a device external to containment device 104, such as a stand-alone device or a device incorporated with borescope controller 106, hand-tracker 110, or other components of system 100.

Computing device 118 may be any suitable computing device, such as a smartphone, a tablet computer, a laptop computer, a desktop computer, or the like. Computing device 118 may be a consumer device configured to perform the techniques of this disclosure by executing program instructions, and/or computing device 106 may be a special purpose device (e.g., computing device of a commercially available borescope controller). Computing device 106 may include various types of fixed function and/or programmable processing circuitry or other hardware, including, but not limited to, microprocessors, controllers, digital signal processors (DSPs), application specific integrated circuits (ASICs), field-programmable gate arrays (FPGAs), or equivalent discrete or integrated logic circuitry, as well as combinations of such components. The term "processing circuitry" may generally refer to any of the foregoing logic circuitry, alone or in combination with other logic circuitry, or any other equivalent circuitry. In some examples, computing device 106 includes hardware that can be configured to execute firmware and/or software that sets forth one or more of the techniques described herein. For example, computing device 106 may be configured to implement functionality, process instructions, or both for execution of processing instructions stored within one or more storage components.

In some examples, system 100 may include user interface 112. User interface 112 is configured to provide user 102 with audio output, tactile output, video output, or the like, and optionally receive tactile input, kinetic input, audio input, optical input, or the like from user 102, as illustrated by connection 138. User interface 112 may include a graphical user interface (GUI) and/or may be implemented using a display device, a keyboard, a touchscreen, a speaker, a microphone, a gyroscope, an accelerometer, a vibration motor, other device configured to receive user input and/or output information receivable by a human and/or a machine. Computing device 106 may be operatively coupled to user interface 112 via link 141. Link 141 may be the same as or substantially similar to link 131 described above. In some examples, computing device 106 and user interface 108 may be integrated into a single device, such as a smart phone, tablet computer, laptop computer, desktop computer, or the like. Computing device 106 may generate information that is communicated via user interface 12 to user 102. In some examples, a display device of user interface 112 may be included in a mobile device of user 102.

As illustrated in FIG. 1, computing device 118 may be communicatively coupled to network 120 via network link 151. In some examples, additional components of system 100 may be coupled to network 120. For example, computing device 118 may be operatively coupled to any one or more of controller 106, borescope cable 108, hand-track 110, user interface 112, feedback device 114, and/or cable sensor 116 via network 120. In other examples, system 100 may not include network 120, but rather operate independent of a network. Network 120 represents any public or private communication network, for instance, cellular, WiFi®, or other types of networks for transmitting data between computing systems, servers, and computing devices. Network link 151 may be any type of network connections, such as wired or wireless connections as discussed above in reference to link 131. Network 120 may provide selected devices, such as computing device 118, with access to the Internet, and may allow computing device 118 to communicate with other components communicatively coupled to network 120.

In some examples, system 100 may include at least one external device 122. External device 122 may include an external computing system, server, a third-party application programmer interface (API), or the like. In some examples, external device 122 may facilitate borescope training by storing a library of training modules, user profiles, training session performance, or other information used to conduct and/or track borescope training programs.

Figure 2:
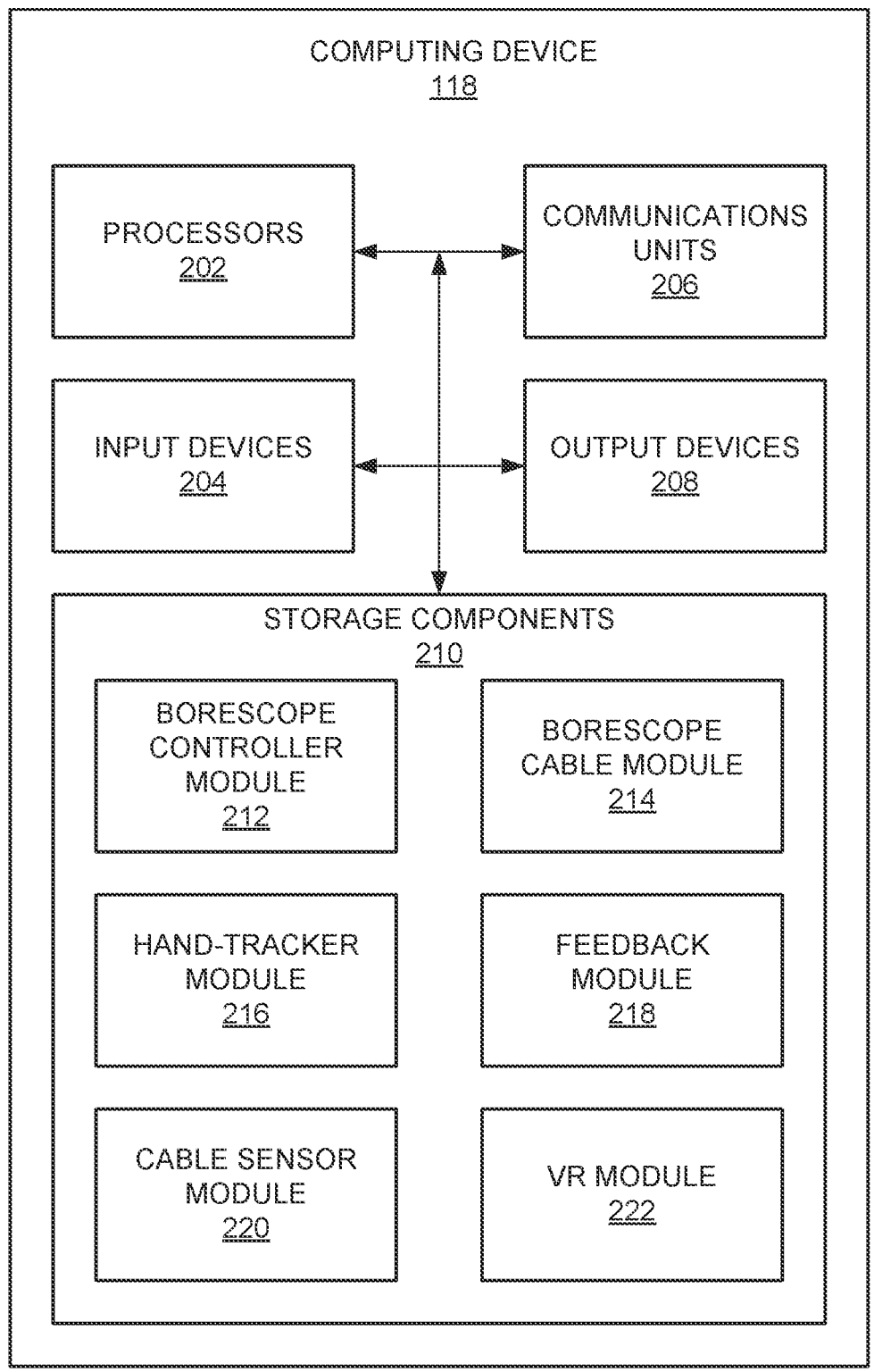
FIG. 2 is a conceptual and schematic block diagram illustrating an example computing device for a VR borescope inspection system.

FIG. 2 is a conceptual and schematic block diagram illustrating computing device 118 for a VR borescope inspection system. In one example approach, computing device 118 includes one or more processors 202, one or more input devices 204, one or more communications units 206, one or more output devices 208, and one or more storage components 210. In some examples, the one or more storage components 210 include borescope controller module 212, borescope cable module 114, hand-tracker module 216, feedback module 218, cable sensor module 220, and virtual environment module 222. In other examples, computing device 118 may include additional components or fewer components than those illustrated in FIG. 2.

One or more processors 202 are configured to implement functionality, process instructions, or both for execution within computing device 118. For example, processors 202 may be capable of processing instructions stored within one or more storage components 210. Examples of one or more processors 202 may include, any one or more of a microprocessor, a controller, a digital signal processor (DSP), an application specific integrated circuit (ASIC), a field-programmable gate array (FPGA), or equivalent discrete or integrated logic circuitry.

Computing device 118 also includes one or more input devices 204. Input devices 204, in some examples, are configured to receive input from a user (e.g., user 102 via user interface 112) through tactile, audio, or video sources. Examples of input devices 204 include a mouse, a button, a keyboard, a voice responsive system, video camera, microphone, touchscreen, or any other type of device for detecting a command from a user or a machine. In some examples, user interface 112 includes all input devices 204 employed by computing device 118. In some examples, input devices 204 may be configured to receive input from borescope controller 106, borescope cable 108, hand-tracker 110, feedback device 114, and/or cable sensor 116.

Computing device 118 further includes one or more communications units 206. Computing device 118 may utilize communications units 206 to communicate with external devices 122 directly and/or via network 120. Communications units 206 may include a network interface card, such as an Ethernet card, an optical transceiver, a radio frequency transceiver, or any other type of device that can send and receive information. Communications units 206 may also include WiFi™ radios or a Universal Serial Bus (USB) interface. In some examples, computing device 118 utilizes communications units 206 to wirelessly communicate with external device 122, such as a server.

Computing device 118 may further include one or more output devices 208. Output devices 208, in some examples, are configured to provide output to user 102, e.g., via user interface 112 using audio, video or tactile media. For example, output devices 208 may include a display, a sound card, a video graphics adapter card, or any other type of device for converting a signal into an appropriate form understandable to humans or machines. In some examples, output device 208 may be configured to provide feedback output to borescope controller 106, borescope cable 108, hand-tracker 110, feedback device 114, and/or cable sensor 116.

One or more storage components 210 may be configured to store information within computing device 118 during operation. One or more storage components 210, in some examples, include a computer-readable storage medium or computer-readable storage device. In some examples, one or more storage components 210 include a temporary memory, meaning that a primary purpose of one or more storage components 210 is not long-term storage. One or more storage components 210, in some examples, include a volatile memory, meaning that one or more storage components 210 does not maintain stored contents when power is not provided to one or more storage components 210. Examples of volatile memories include random access memories (RAM), dynamic random-access memories (DRAM), static random-access memories (SRAM), and other forms of volatile memories known in the art. In some examples, one or more storage components 210 are used to store program instructions for execution by processors 202. One or more storage components 210, in some examples, are used by software or applications running on computing device 118 to temporarily store information during program execution.

In some examples, one or more storage components 210 may further include one or more storage components 210 configured for longer-term storage of information. In some examples, one or more storage components 210 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Storage components 210 may include or store borescope controller module 212, borescope cable module 114, hand-tracker module 216, feedback module 218, cable sensor module 220, and virtual environment module 222. Each of borescope controller module 212, borescope cable module 114, hand-tracker module 216, feedback module 218, cable sensor module 220, and virtual environment module 222 may be implemented in various ways. For example, one or more of borescope controller module 212, borescope cable module 114, hand-tracker module 216, feedback module 218, cable sensor module 220, and virtual environment module 222 may be implemented as an application or a part of an application executed by one or more processors 202. In other examples, one or more of borescope controller module 212, borescope cable module 114, hand-tracker module 216, feedback module 218, cable sensor module 220, and virtual environment module 222 may be implemented as part of a hardware unit of computing device 118 (e.g., as circuitry). In other examples, one or more of borescope controller module 212, borescope cable module 114, hand-tracker module 216, feedback module 218, cable sensor module 220, and virtual environment module 222 may be implemented remotely on a third-party device as part of an application executed by one or more processors of the third-party device or as a hardware unit of the third-party device (e.g., external device 112). Functions performed by one or more of borescope controller module 212, borescope cable module 114, hand-tracker module 216, feedback module 218, cable sensor module 220, and virtual environment module 222 are explained below with reference to the example flow diagram illustrated in FIG. 7.

In one example approach, VR module 222 may include one or more training modules. Additionally, or alternatively, computing device 118, e.g., VR module 222, may receive one or more training modules from external device 122. Each training module may correspond to a respective training environment, such as respective mechanical system suitable for borescope inspection. User 102 may select, e.g., via input devices 204, a training module from the plurality of training modules. Output devices 208 may output a virtual environment corresponding the selected training module. For example, computing device 118 may output, e.g., via output device 208, a graphical user interface corresponding to the selected virtual training environment.

Computing device 200 may receive data from input devices 204 (e.g., borescope controller 106, borescope cable 108, hand-tracker 110, feedback device 114, and/or cable sensor 116) as user 102 interacts with the virtual training environment. For example, borescope controller module 212 may be configured to receive from input devices 204, e.g., borescope controller 106, data indicative a command provided from user 102 to cause deflection of a distal portion of borescope cable 108. In response to the input, borescope controller module 212 may be configured to simulate the deflection in the virtual environment. In some examples, when the distal portion of borescope cable 108 is constrained in the virtual environment, such as due to conflict with an obstruction, borescope controller module 212 may be configured to generate an alert, such as via user interface 112 or feedback via borescope controller 106. In this way, computing device 118 may be configured to improve virtual training by simulating borescope control in the virtual environment and providing user 102 immediate feedback regarding proper borescope cable navigation techniques in a variety of virtual environments.

Borescope cable module 214 may be configured to receive from input devices 204, e.g., borescope cable 108, data indicative an operational parameter of borescope cable 108. For example, the operational parameters may include a type of borescope cable, a status of a connection between borescope controller 106 and borescope cable 108 (e.g., properly connection or not properly connect), images from a camera of borescope cable 108, or other data associated with operation of borescope cable 108. In response to the input, borescope cable module 214 may be configured to alert user 102 of one or more operational parameters, such as via user interface 112. In this way, computing device 118 may be configured to improve virtual training by providing user 102 immediate feedback regarding proper borescope cable identification and equipment setup techniques.

Hand-tracker module 216 may be configured to receive from input devices 204, e.g., hand-tracker 110, data indicative a hand movement or a hand posture of user 102. In response to the input, hand-tracker module 216 may be configured to simulate the hand movements the virtual environment. In some examples, when the hand posture of user 102 is improper, e.g., user 102 is grasping borescope cable 108 with too much pressure or using improper hand position, hand-tracker module 216 may be configured to generate an alert, such as via user interface 112 or feedback via hand-tacker 110. In this way, computing device 118 may be configured to improve virtual training by simulating hand movements in the virtual environment and providing user 102 immediate feedback regarding proper borescope cable handling techniques.

Feedback module 218 may be configured to determine, based on movements of the borescope cable in real world and mapping of this movement to the virtual environment, conflicts with obstructions in the virtual environment. In response to determining a conflict with an obstruction, feedback module 218 may be generate an output, e.g., via output devices 208, and provide the output to feedback device 114. In response to the output, feedback device 114 may apply friction to borescope cable 108 to simulate the conflict with the obstructions. Additionally, in some examples, feedback module 218 may cause borescope controller module 212, to provide feedback to user 102, as discussed above.

In some examples, an amount of friction applied by feedback device 114 to borescope cable 108 may be based on a conflict angle. For example, the conflict angle may include an angle at which the borescope cable contacts the obstruction in the virtual environment. When the borescope cable contacts the obstruction in the virtual environment at a perpendicular angle (e.g., 90-degrees), the amount of friction may include a maximum amount of friction. In some examples, the maximum amount of friction may prevent further advancing borescope cable 108. When the borescope cable contacts the obstruction in the virtual environment at an angle less than 90-degrees (e.g., measured as the smallest angle from a line tangential to a surface of the obstruction to a longitudinal axis of the borescope cable), the amount of friction may be between the maximum amount of friction and zero friction.

Additionally, or alternatively, when the borescope cable contacts the obstruction in the virtual environment at an angle less than a selected bump-angle, such as, e.g., less than 45-degrees, the output from feedback module 218 may cause feedback device 114 to apply friction to borescope cable 108 for brief duration, e.g., less than one second, to simulate contact without constraining the borescope cable. In other words, contact at an angle less than the bump-angle may feel like a glancing bump, though user 102 may still freely move borescope cable 108. In this way, computing device 118 may be configured to improve virtual training by simulating varying amount of conflicts with virtual obstructions.

In some examples, when the borescope cable contacts the obstruction in the virtual environment, computing device 118 may determine, based on a determined conflict angle, a direction of movement of borescope cable 108 in the virtual environment. For example, if borescope cable 108 contacts an obstruction at a selected angle, e.g., less than 90-degrees or less than 45-degrees, computing device 118 may output a visual representation of borescope cable 108 moving in contact with, e.g., scraping along, the obstruction and moving with, e.g., following, a geometry of the obstruction.

In examples in which feedback device 114 is configured to constrain movement of borescope cable 108 in two opposing directions (e.g., both distal push and proximal pull), each mechanism to mechanically constrain borescope cable 108 may operate as discussed above. Additionally, when the borescope cable contacts a plurality of obstructions in the virtual environment that would prevent movement in both distal and proximal directions, the output from feedback module 218 may cause feedback device 114 to apply friction to borescope cable 108 using both mechanisms to mechanically constrain borescope cable 108 to simulate a full entrapment of the virtual borescope cable. In this way, computing device 118 may be configured to improve virtual training by simulating environments in which a borescope may subject to full entrapment and providing user 102 immediate feedback regarding techniques to correct.

Cable sensor module 220 may be configured to receive from input devices 204, e.g., cable sensor 116, data indicative a length of borescope cable 108 inserted into containment device 104. In response to the input, cable sensor module 220 may be configured to simulate distal and proximal movement of the borescope cable in the virtual environment. In this way, computing device 118 may be configured to improve virtual training by simulating movements of the borescope cable in the virtual environment.

Computing device 118 may also include additional components that, for clarity, are not shown in FIG. 2. For example, computing device 118 may include a power supply to provide power to the components of computing device 118. Similarly, the components of computing device 118 shown in FIG. 2 may not be necessary in every example of computing device 118.

Figure 3:
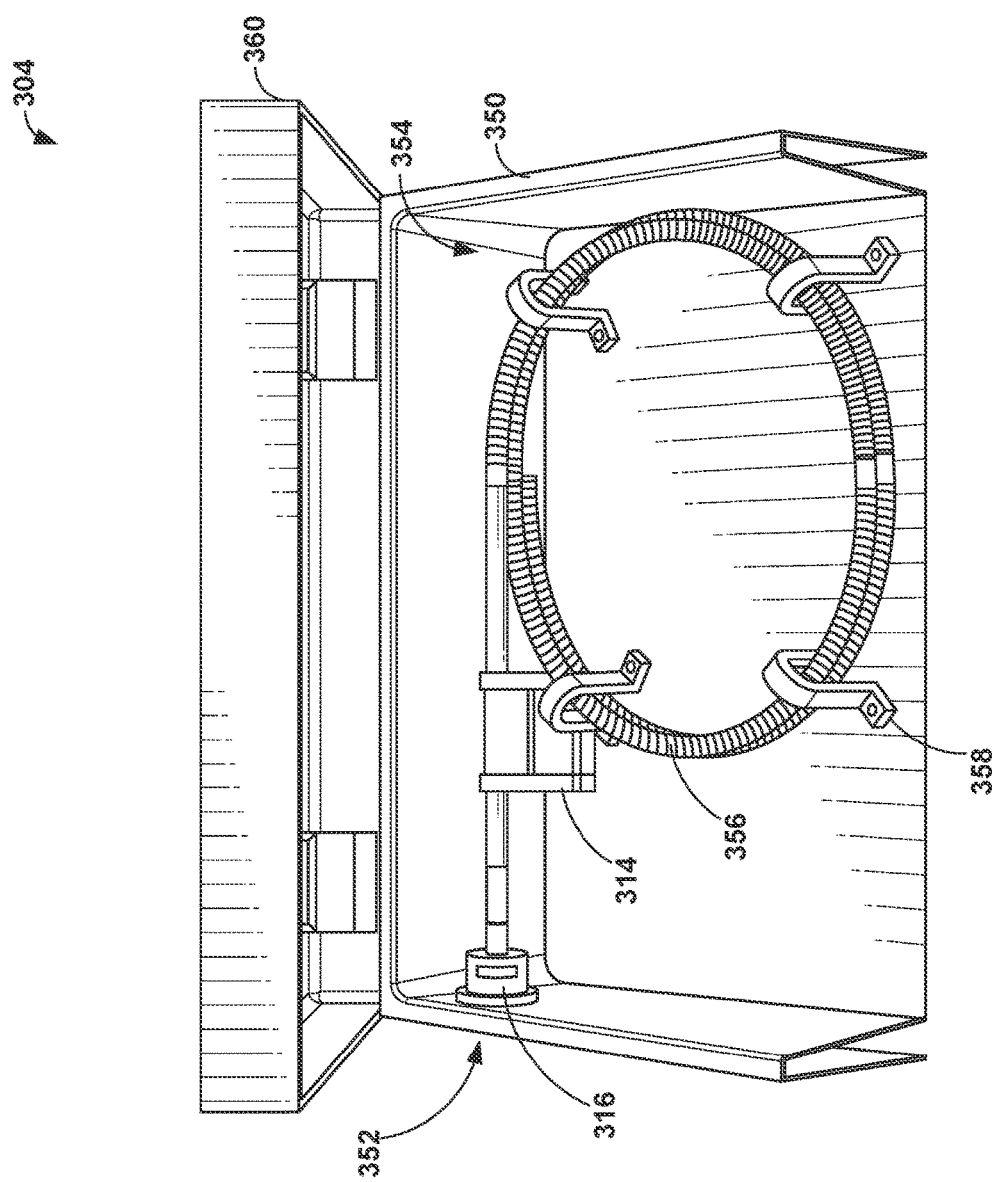
FIG. 3 is a conceptual diagram illustrating an example containment device of a VR borescope inspection system.

FIG. 3 is a conceptual diagram illustrating an example containment device 304 of a VR borescope inspection system. Containment device 304 may be the same as or substantially similar to containment device 104 described above in reference to FIGS. 1 and 2, except for the differences described herein. For purposes of illustration, a front face of containment device 304 is not illustrated in FIG. 3. It will be understood that containment device 304 may include a front face, which may be similar to or substantially the same as the back face of containment device 304. Containment device 304 includes a case 350 defining an aperture 352 and a cavity 354 housing a cable sensor 316, a feedback device 314, and a coiled tube 356. In some examples, cavity 354 may be configured to house one or more additional components, such as borescope controller 106, borescope cable 108, hand-tracker 110, user interface 112, and/or computing device 118 (all shown in FIG. 1).

As discussed above, case 350 may be formed from any suitable material, and with any suitable dimensions. In some examples, the materials and dimensions of case 350 may be selected for transporting case 350 as carry-on or stowable luggage on domestic or international flights. In this way, containment device 304 may be suitable to transport to various training locations, including for example home or office use. In some examples, containment device 304 may include a hinged lid 360.

Cable sensor 316 may be the same or substantially similar to cable sensor 116 described above in reference to FIGS. 1 and 2, except for the differences described herein. Cable sensor 316 may be coupled to aperture 352 to enable cable sensor 316 to detect when a borescope cable is inserted into aperture 352 and/or to detect a total length of the borescope cable inserted into coiled tube 356.

Feedback device 314 may be the same or substantially similar to feedback device 114 described above in reference to FIGS. 1 and 2, except for the differences described herein. Feedback device 314 may be positioned adjacent to cable sensor 316. For example, a substantially straight segment of tubing may couple an aperture of cable sensor 316 to an aperture of feedback device, the respective apertures configured to receive a cross-section of a borescope cable. In other examples, feedback device 314 may be directly coupled to cable sensor 316. Additionally, or alternatively, the relative positions of cable sensor 316 and feedback device 314 may be reversed, such that the borescope cable is first fed through an aperture of feedback device 314 and second through an aperture of cable sensor 316.

Coiled tube 356 may include an elongate tubular member extending from a proximal end to a distal end and defining a lumen configured to receive a cross-section of a borescope cable therein. The proximal end may coupled to feedback device. Coiled tube 356 may be secured in the coiled configuration by one or more brackets 358 that are anchored to containment device 304.

Figure 4B:
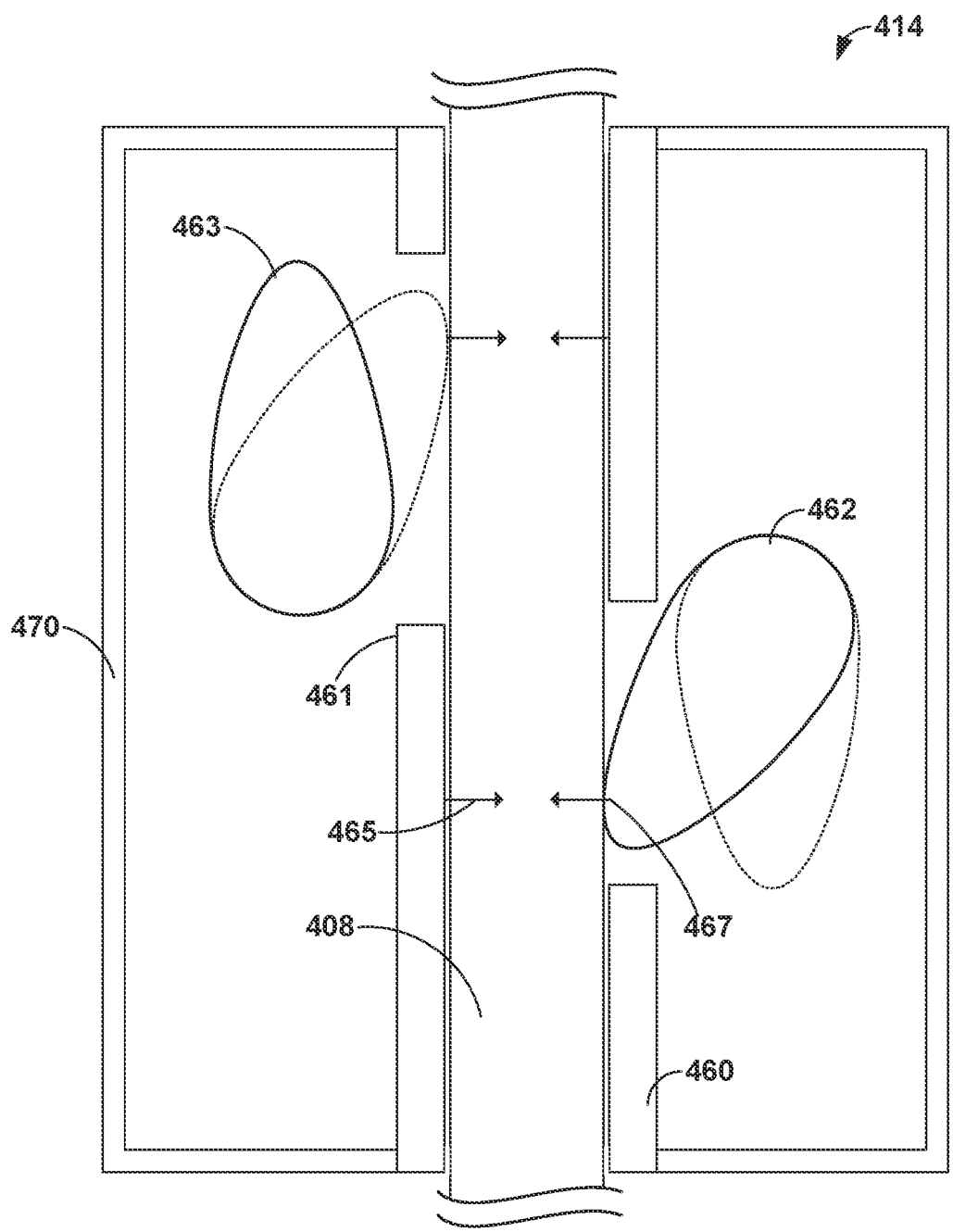

FIGS. 4A and 4B are a conceptual diagram illustrating an example feedback device 414 of a VR borescope inspection system. Feedback device 414 may be the same as or substantially similar to feedback device 114 and 314 described above in reference to FIGS. 1-3, except for the differences described herein. Feedback device 414 may include a guide tube 460, a cam cleat 462, a servo-arm 464, a servomotor 466, and an electrical coupling 468. Each component of feedback device 414 may be mounted on one or more brackets and/or attached to an interior surface of a containment device. In some examples, as illustrated in the cross-sectional plan view of FIG. 4B, feedback device may include a housing 470.

Guide tube 460 is configured to receive a cross-section on borescope cable 408 therethrough. Guide tube 460 may align borescope cable 408 with cam cleat 462 and/or define a rigid backplate 461 (FIG. 4B) to provide reaction force (e.g., illustrated as arrow 465) in response to actuation (e.g., illustrated as arrow 467) of cam cleat 462 to contact borescope cable 408. In other words, feedback device 414 may pinch borescope cable 408 between rigid backplate 461 and cam cleat 462 to provide a friction for to borescope cable 408.

Cam cleat 462 is configured to actuate in a clockwise direction to contact borescope cable 408 to resist movement of borescope cable 406 in a distal direction (e.g., a push force). Servo-arm 464 is configured to mechanically couple cam cleat 462 to servomotor 466. Servomotor 466 may include an electrical motor configured to rotate servo-arm 464 by a selected amount based on an electrical signal (e.g., a current and/or a voltage) supplied to servomotor 466. The rotation of servo-arm 464 actuates cam cleat 462.

As illustrate in FIG. 4B, feedback device 414 may include a second cam cleat 463. Cam cleat 463 may operate in the same or substantially similar manner as described with respect to cam cleat 462, except that cam cleat 463 is configured to resist movement of borescope cable 406 in a proximal direction (e.g., a pull force).

Electrical coupling 468 may include any suitable electrical connection configured to coupled servomotor 466 to a controller, such as computing device 118, and/or a power source.

Figure 5:
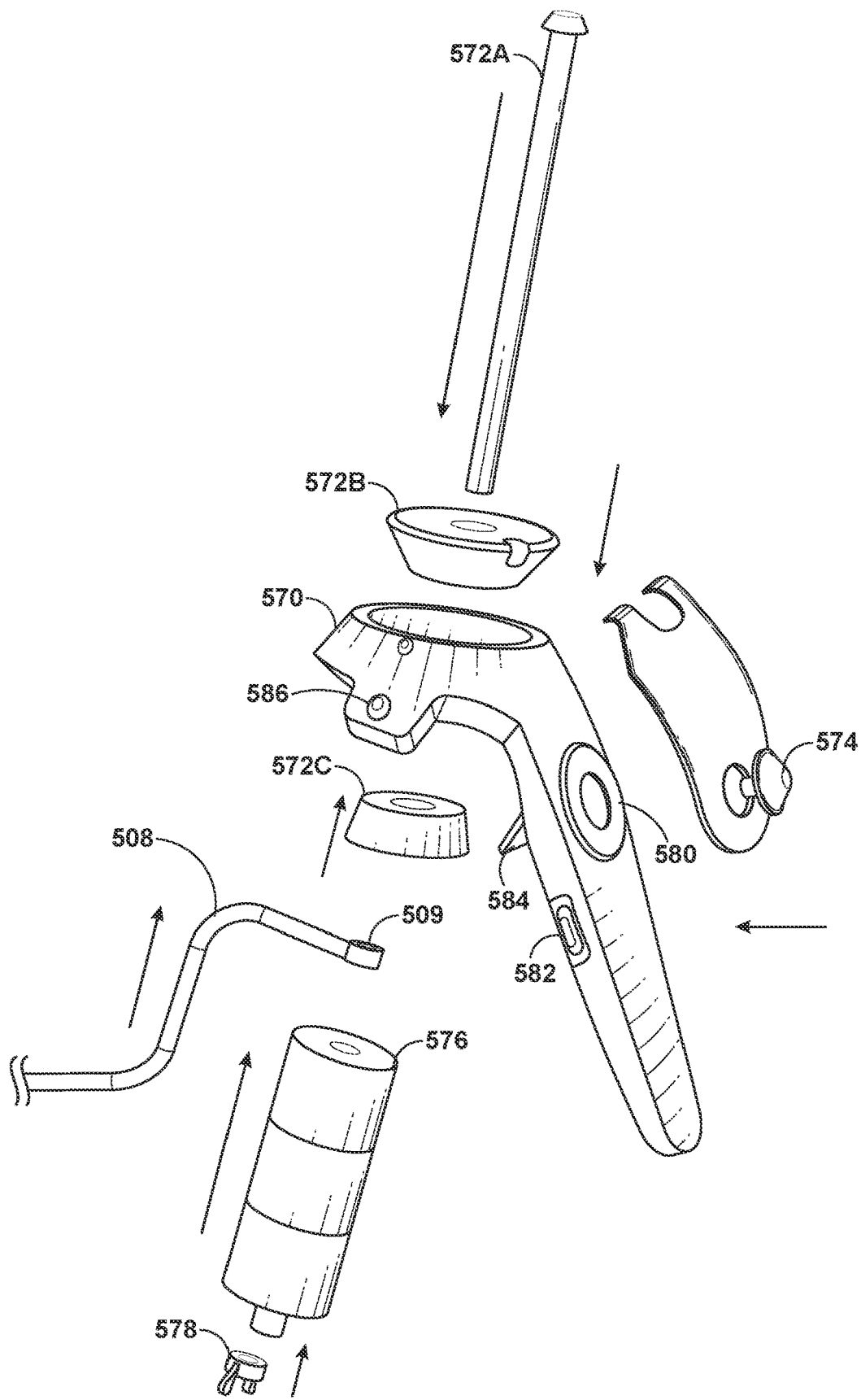
FIG. 5 is a conceptual diagram illustrating an example controller of a VR borescope inspection system.

FIG. 5 a conceptual diagram illustrating an exploded view of an example borescope controller 506 of a VR borescope inspection system. Borescope controller 506 may be the same as or substantially similar to borescope controller 106 described above in reference to FIGS. 1-2, except for the differences described herein. Borescope controller 506 includes VR controller 570, weight mount 572A, 572B, and 572C, joystick 574, weights 576, borescope cable 508, and weight fastener 578.

In the example illustrated in FIG. 5, VR controller 570 includes a commercially available VR controller, such as a VIVE™ controller. In other examples, VR controller 570 may include an actual borescope controller configured to operatively coupled to a component of a VR system, such as computing device 118. VR controller 570 may include one or more input features, such as, for example, a trackpad 580, a grip button 582, a trigger button 584, and/or one or more tracking sensors 586. Trackpad 580 may be configured to interface with a joystick 574. Grip button 582 and trigger button 584 may be configured to simulate various control input of a borescope, such as, e.g., operation of a light or a camera, locking an articulation of the borescope cable, and/or interfacing with a VR environment, such as, e.g., selection of a training module, resetting a simulation, or the like. One or more tracking sensors 586 may be configured to enable, e.g., via an infrared or optic tracking device, track a movement of controller 506 in 3D space.

Weight mount 572A, 572B, and 572C (collectively, mounts 572) are configured to secure weights 576 to VR controller 570. For example, mounts 572B and 572C may define a conical shape to seat in an aperture defined by VR controller 570. Mount 572A may include a bolt or pin that extends through mounts 572B and 572C, through an eyelet 509 of borescope cable 508, and through weights 576 for fastening by fastener 578. In some examples, the weight of each of VR controller 570, weight mount 572A, 572B, and 572C, joystick 574, weights 576, borescope cable 508, and weight fastener 578 may be selected such that a total weight of controller 506 is the same or substantially similar to the weight of an actual borescope controller. In some examples, an angle of the chamfered surface of mounts 572B and/or 572C may be selected to position weights 576 to provide controller 506 the same or substantially similar center of mass as an actual borescope controller.

Joystick 574 may be coupled to a mounting surface configured to friction fit to a surface of VR controller 570. A shape of joystick 574 may be selected to be the same as or substantially similar to a shape of a joystick of an actual borescope controller. In this way, operation of the joystick 574 of controller 507 may have the same or substantially similar feel as the operation of an actual borescope joystick.

Figure 6:
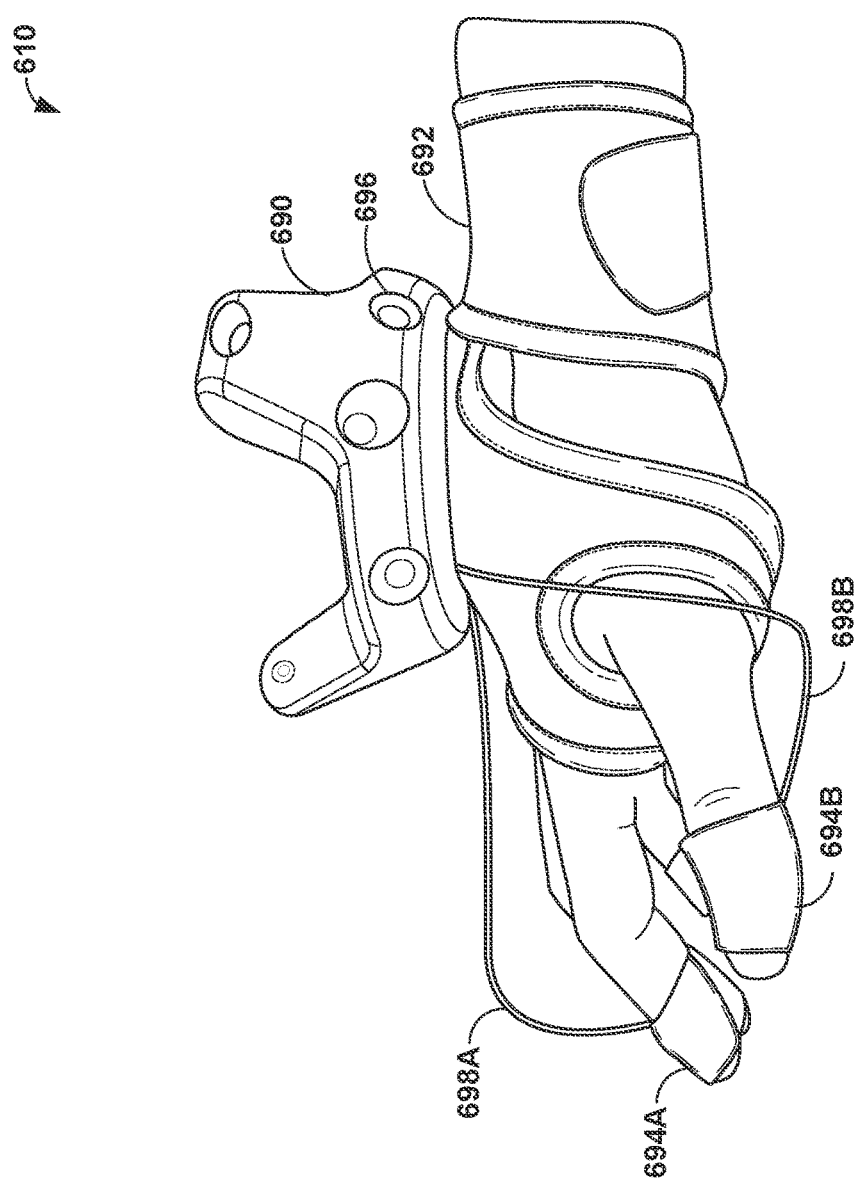
FIG. 6 is a conceptual diagram illustrating an example hand-tracker device of a VR borescope inspection system.

FIG. 6 is a conceptual diagram illustrating an example hand-tracker device 610 of a VR borescope inspection system. Hand-tracker 610 may be the same as or substantially similar to hand-tracker 110 described above in reference to FIGS. 1 and 2, except for the differences described herein. Hand-tracker 610 includes tracker 690, strap 692, and finger sleeves 694A and 694B (collectively, finger sleeves 694). Tracker 690 may include any suitable VR tracker device. In some examples, tracker 690 may include a VIVE™ tracker, available from HTC Corporation, Taoyuan City, Taiwan.

Tracker 690 is coupled to strap 692, which is configured to be secured to the hand of user 102 for handling borescope cable 108 (FIG. 1). For example, strap 692 may include hook and loop fasteners, buckles, clips, or other releasable mechanical fastening devices. Once secured to the hand of user 102, finger sleeves 694 may be fitted to the thumb and forefinger of user 102. Finger sleeves 694 may include a conductive pad electrically coupled to tracker 690 via respective electrical connections 698A and 698B.

Tracker 690 includes a plurality of sensors 696. The plurality of sensors are configured to enable, e.g., via an infrared or optic tracking device, tracking of movements of tracker 690 in 3D space. In some examples, hand-tracker device 610 may include additional sensors, such as one or more sensors on finger sleeves 694.

Figure 7:
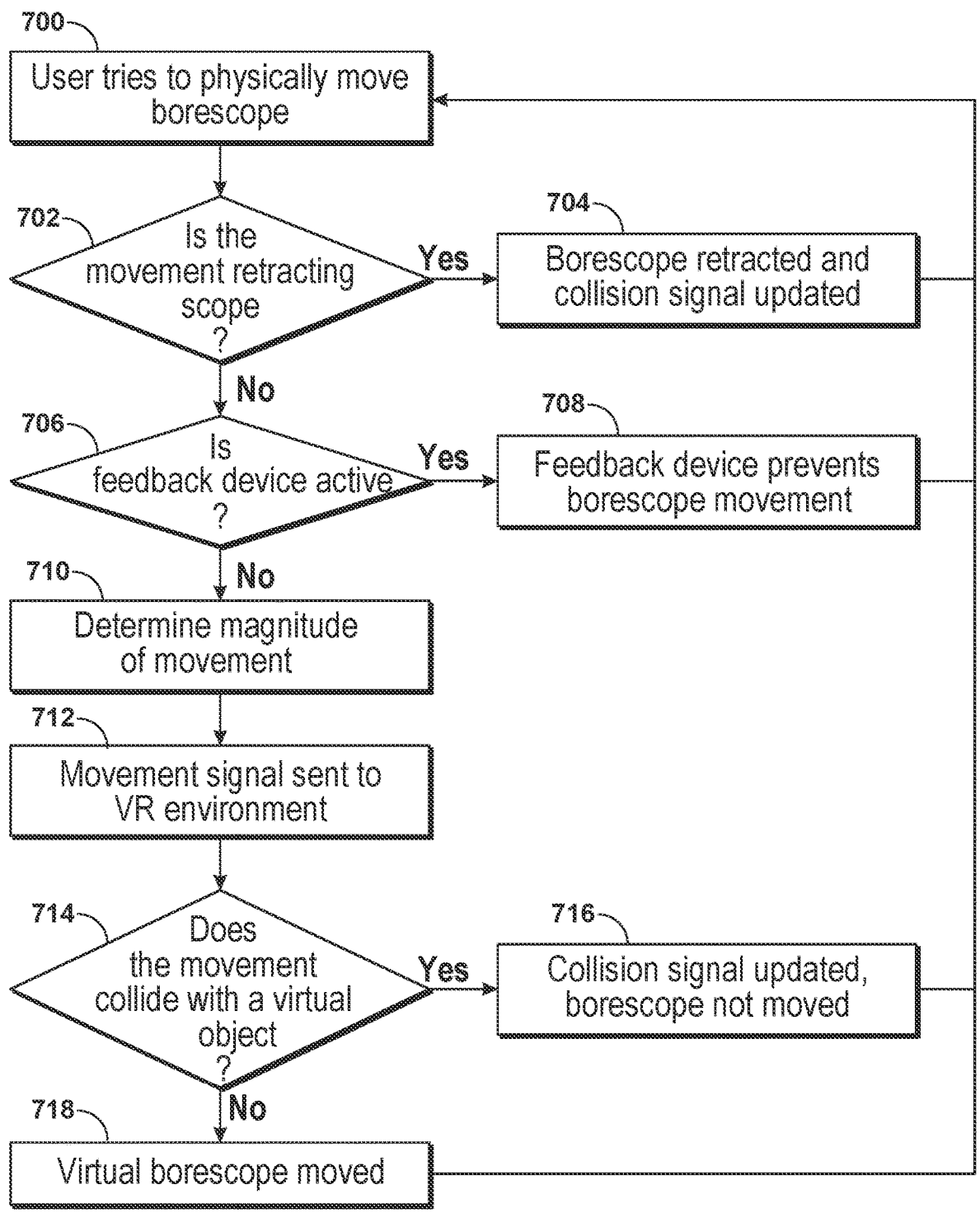
FIG. 7 is a flow diagram illustrating an example technique for providing haptic feedback for a VR borescope inspection system.

FIG. 7 is a flow diagram illustrating an example technique for providing haptic feedback for a VR borescope inspection system. The technique illustrated in FIG. 7 is describe below in reference to system 100 described above in reference to FIGS. 1 and 2. In some examples, other systems may be used to perform the technique illustrated in FIG. 7. Additionally, system 100 may be used to perform other techniques for providing haptic feedback for a VR borescope inspection system.

In some examples, although not illustrated in FIG. 7, the technique may include setting up system 100. For example, setting up system 100 may include coupling borescope controller 106 to borescope cable 106, securing hand-tracker 100 to a hand of user 102, and/or communicatively coupling one or more of borescope controller 106, borescope cable 108, hand-tracker 110, user interface 112, feedback device 114, or cable sensor 116 to computing device 118. Additionally, or alternatively, setting up system 100 may include selecting, by user 102 via user interface 112, a training module or other virtual environment. In some examples, selecting the training module or virtual environment may include retrieving, e.g., by computing device 118, the training module or virtual environment from external device 122.

Once system 100 is set-up and a training module (e.g., simulation) is started, the technique includes moving, by user 102, borescope cable 108 (700). In examples in which system 100 includes hand-tracker 110, the technique may include outputting to hand-tracker 110, in response to the hand posture of user 102, a posture signal to hand-tracker 110. The posture signal may be configured to at least one cause of a vibration device of hand-tracker 110 to vibrate or cause a force resistance device of hand-tracker 110 to apply resistance to one or more portions of the hand-tracker. For example, hand-tracker 110 may include conductive pads configured to generate a posture output indicative of contact with borescope cable 108. The technique may include determining, by computing device 118, based on the posture output from hand-tracker 108, a hand posture of a user. In some examples, the posture signal may be based on the posture output. For example, when the hand posture of user 102 is incorrect, the posture signal may cause the hand-tracker 110 to vibrate or provide a resistance force to encourage user 102 to correct the hand posture.

The technique includes determining, in response to a movement of borescope cable 108, whether borescope cable 108 is being retracted (702). For example, cable sensor 116 may sense motion of borescope cable 108. Cable sensor 116 may generate an signal indicative of a direction of an axial motion (e.g., along the longitudinal axis), a direction of circumferential motion (e.g., twist about the longitudinal axis), and/or a magnitude of the motion (e.g., an amount of the axial motion, the circumferential motion, or both) and provide the output to computing device 118. Computing device 118, e.g., cable sensor module 214, may determine based on the cable sensor data output by cable sensor 116, the direction of the motion of borescope cable 108.

In response to determining the movement is in the proximal direction (e.g., the movement is retracting the scope) (YES), the technique may include moving, by computing device 118 in the virtual environment, the virtual borescope in the proximal direction (704). Optionally, computing device 118 may update an alert, such as a collision signal. For example, computing device 118 may update the collision signal to indicate "no collision."

In response to determining the movement is not in the proximal direction (e.g., the movement is advancing the borescope cable) (NO), the technique may include determining, by computing device 118, whether the feedback device 114 is actuated to provide friction to borescope cable 108 (e.g., whether the feedback device active) (706). When feedback device 114 is active (YES), feedback device 114 may prevent advancement of borescope cable 108 (708).

When feedback device 114 is not active (NO), technique may include determining, by computing device 118, e.g., based on the cable sensor data output by the cable sensor, the magnitude of the motion of borescope cable 108 (710). The technique may include outputting, by computing device 118, a graphical user interface representing the magnitude of the motion of the borescope cable in the virtual environment (712). For example, a movement signal, e.g., a direction and magnitude of movement, may be sent to the virtual environment for display to the user (e.g., movement signal sent to VR environment). In some examples, the technique may include outputting the graphical user interface for display by a display device, e.g., user interface 112.

The technique includes determining, by computing device 118, based on the at least one of the direction of the axial motion, the direction of the circumferential motion, or the magnitude of the motion, whether the movement of the virtual reality representation of the distal portion of the borescope cable collides with an obstruction in the virtual environment (714).

In examples in which the movement results in a collision of the virtual reality representation of the distal portion of the borescope cable with an obstruction in the virtual environment (YES), the technique may include outputting to the feedback device a feedback signal that is configured to actuate the feedback device to apply an amount of friction to the borescope cable (716).

As discussed above the amount of friction may be variable. For example, the technique may include determining, by computing device 118, based on at least one of the direction of the axial motion, the direction of the circumferential motion, or the magnitude of the motion relative to the obstruction in the virtual environment, an angle of the collision the virtual reality representation of the distal portion of the borescope cable relative to a surface of the obstruction. The amount of friction may be based on the angle of the collision. For example, a perpendicular collision (e.g., 90-degrees) may result in full stop or full actuation of feedback device 114 to substantially prevent movement of borescope cable 108. At angles less than 90-degrees, the actuation may be a portion of full actuation so as to cause resistance, but not a full stop of movement. In this way, the technique may generate haptic feedback indicative of the collision of the virtual borescope with an obstruction in the virtual environment. In examples in which the movement does not result in a collision (NO), feedback device 114 is not actuated and borescope cable 108 is allowed to move freely.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A system, comprising:
    a borescope cable comprising a flexible elongate member extending along a longitudinal axis;
    a containment device having an exterior surface defining an aperture configured to receive at least a distal portion of the borescope cable therethrough and an interior surface defining a cavity;
    a cable sensor coupled to the interior surface of the containment device, wherein the cable sensor is configured to detect motion of the borescope cable and output cable sensor data indicative of the motion of the borescope cable;
    a feedback device coupled to the interior surface of the containment device, wherein the feedback device is configured to controllably apply friction to the borescope cable; and
    a computing device comprising one or more storage devices and one or more processors coupled to the storage devices, wherein the storage devices comprise instructions that cause the one or more processors to:
        output, for display by a display device, a graphical user interface of a virtual reality representation of a distal portion of the borescope cable in a virtual environment;
        determine, based on the cable sensor data output by the cable sensor, at least one of a direction of axial motion, a direction of circumferential motion, or a magnitude of the motion of the borescope cable;
        determine, based on the at least one of the direction of the axial motion, the direction of the circumferential motion, or the magnitude of the motion, a collision of the virtual reality representation of the distal portion of the borescope cable with an obstruction in the virtual environment; and
        output, in response to determining the collision, a feedback signal to the feedback device, wherein the feedback signal is configured to cause the feedback device to apply an amount of friction to the borescope cable.

2. The system of claim 1, wherein the one or more storage devices further comprise instructions that cause the one or more processors to determine, based on at least one of the direction of the axial motion, the direction of the circumferential motion, or the magnitude of the motion relative to the obstruction in the virtual environment, an angle of the collision of the virtual reality representation of the distal portion of the borescope cable relative to a surface of the obstruction, and wherein the amount of friction is based on the angle of the collision.

3. The system of claim 1, further comprising a hand-tracker comprising conductive pads configured to generate a posture output indicative of contact with the borescope cable, and wherein the storage devices further comprise instructions that cause the one or more processors to determine, based on the posture output from the hand-tracker, a hand posture of a user.

4. The system of claim 3, wherein the hand-tracker further comprises at least one of a vibration device or a resistance device, wherein the storage devices further comprises instructions that cause the one or more processors to output, in response to the hand posture of the user, a posture signal to the hand-tracker device, and wherein the posture signal is configured to at least one cause of the vibration device to vibrate or cause the resistance device to apply resistance to one or more portions of the hand-tracker.

5. The system of claim 3, wherein the hand-tracker comprises a virtual reality glove comprising at least one motion sensor and least one of a vibration device or a resistance device.

6. The system of claim 1, wherein the containment device comprises a coiled tube defining a lumen coupled to the aperture, wherein the lumen is configured to receive at least a distal portion of the borescope cable therethrough.

7. The system of claim 1, wherein the system further comprises a borescope controller configured to generate a controller output indicative of a deflection of the borescope cable, wherein the one or more storage devices further comprise instructions that cause the one or more processors to output, based on the controller output, for display by a display device, a second graphical user interface representing the deflection of the borescope cable in a virtual environment.

8. The system of claim 7, wherein the one or more storage devices further comprise instructions that cause the one or more processors to output, based on the controller output, a controller feedback signal to the borescope controller, wherein the controller feedback signal is configured to cause the borescope controller to provide at least one of audible, tactile, or visual feedback to a user.

9. The system of claim 1, wherein the borescope controller comprises one or more mounts configured to simulate at least one of simulate a thumb control, dimensions, weight, or center of mass of a selected actual borescope controller.

10. The system of claim 1, wherein the flexible elongate member of the borescope cable comprises a radially outer sheath, and wherein the cable sensor is configured to detect a surface feature of the outer sheath to detect the motion of the borescope cable.

11. A method for generating haptic feedback for a borescope cable comprising a flexible elongate member extending along a longitudinal axis using a containment device having an exterior surface defining an aperture configured to receive at least a distal portion of the borescope cable therethrough and an interior surface defining a cavity, the method comprising:
    determining, by a computing device, based on cable sensor data output by a cable sensor, at least one of a direction of axial motion, a direction of circumferential motion, or a magnitude of the motion of the borescope cable, wherein the cable sensor is coupled to the interior surface of the containment device and configured to detect motion of the borescope cable and output cable sensor data indicative of the motion of the borescope cable;

determining, by the computing device, based on the at least one of the direction of the axial motion, the direction of the circumferential motion, or the magnitude of the motion, a collision of a virtual reality representation of a distal portion of the borescope cable with an obstruction in a virtual environment;

outputting, by the computing device, in response to determining the collision, a feedback signal to a feedback device coupled to the interior surface of the containment device; and applying, by the feedback device, based on the feedback signal, an amount friction to the borescope cable.

12. The method of claim 11, wherein the method further comprises determining, based on at least one of the direction of the axial motion, the direction of the circumferential motion, or the magnitude of the motion relative to the obstruction in the virtual environment, an angle of the collision of the virtual reality representation of the distal portion of the borescope cable relative to a surface of the obstruction, and wherein the amount of friction is based on the angle of the collision.

13. The method of claim 11, wherein the method further comprises outputting, by the computing device, for display by a display device, a graphical user interface of a virtual reality representation of a distal portion of the borescope cable in the virtual environment.

14. The method of claim 13, wherein the method further comprises outputting, by the computing device, for display by a display device, based on at least one of the direction of the axial motion, the direction of the circumferential motion, or the magnitude of the motion relative to the obstruction in the virtual environment, a second graphical user interface of the virtual reality representation of the distal portion of the borescope cable in an updated position within the virtual environment.

15. The method of claim 11, wherein the method further comprises determining, by the computing device, based on a posture output from a hand-tracker, a hand posture of a user, wherein the hand-tracker comprises conductive pads configured to indicate the hand posture of the user and output a posture output indicative of contact with the borescope cable.

16. The method of claim 15, wherein the hand-tracker further comprises at least one of a vibration device or a resistance device, wherein the method further comprises outputting, in response to the hand posture of the user, a posture signal to the hand-tracker device, wherein the posture signal is configured to at least one cause of the vibration device to vibrate or cause the resistance device to apply resistance to one or more portions of the hand-tracker.

17. The method of claim 11, wherein the method further comprises outputting, by the computing device, based on a controller output generated by a borescope controller, for display by a display device, a second graphical user interface representing a deflection of the borescope cable in a virtual environment.

18. The method of claim 11, wherein the method further comprises outputting, by the computing device, in response to determining the collision, a collision signal to a user interface.

19. A kit, comprising:
a borescope cable comprising a flexible elongate member extending along a longitudinal axis;
a borescope controller coupled to a proximal end of the borescope cable and configured to generate a controller output indicative of a deflection of the borescope cable;
a containment device having an exterior surface defining an aperture configured to receive at least a distal portion of the borescope cable therethrough and an interior surface defining a cavity, wherein the containment device comprises a coiled tube defining a lumen coupled to the aperture, and wherein the lumen is configured to receive at least a distal portion of the borescope cable therethrough;
a cable sensor coupled to the interior surface of the containment device, wherein the cable sensor is configured to detect motion of the borescope cable and output cable sensor data indicative of the motion of the borescope cable; and
a feedback device coupled to the interior surface of the containment device, wherein the feedback device comprises at least one cam cleat coupled to a servomotor configured to controllably apply friction from the cam cleat to the borescope cable.

20. The kit of claim 19, further comprising a hand-tracker comprising conductive pads configured to generate a posture output indicative of contact with the borescope cable.

* * * * *